United States Patent [19]
Gerwig et al.

[11] Patent Number: 5,409,657
[45] Date of Patent: Apr. 25, 1995

[54] PROCESS FOR MAKING ORIENTED SEMICRYSTALLINE POLYESTER FILMS

[75] Inventors: Dominique Gerwig, Lyon; Gilles Lorentz, Villeurbanne; Timothy Stevenson, Montluel, all of France

[73] Assignee: Rhone-Poulenc Films, Courbevoie Cedex, France

[21] Appl. No.: 966,449

[22] Filed: Oct. 26, 1992

[30] Foreign Application Priority Data

Oct. 24, 1991 [FR] France .................. 91 13360

[51] Int. Cl.$^6$ ............................................. B29C 55/14
[52] U.S. Cl. .................................................. 264/290.2
[58] Field of Search ............... 264/290.2, 210.7, 235.8, 264/237

[56] References Cited

U.S. PATENT DOCUMENTS

| | | | |
|---|---|---|---|
| 3,177,277 | 4/1965 | Adams et al. | 265/290.2 X |
| 4,237,088 | 12/1980 | Yoshimura et al. | 264/290.2 X |
| 4,497,865 | 2/1985 | Minami et al. | 264/290.2 X |
| 4,798,759 | 1/1989 | Dallman et al. | 264/290.2 X |
| 5,139,727 | 8/1992 | Utsumi et al. | 264/235.8 |

FOREIGN PATENT DOCUMENTS

| | | | |
|---|---|---|---|
| 219896 | 11/1957 | Australia | 264/290.2 |
| 0229346 | 7/1987 | European Pat. Off. . | |
| 0279611 | 8/1988 | European Pat. Off. . | |
| 3621205 | 1/1988 | Germany . | |
| 1430291 | 3/1976 | United Kingdom | 264/290.2 |
| 2134442 | 8/1984 | United Kingdom . | |

*Primary Examiner*—Leo B. Tentoni
*Attorney, Agent, or Firm*—Burns, Doane, Swecker & Mathis

[57] ABSTRACT

Disclosed are semicrystalline polyester oriented films having the properties of MD F5≧18 daN/mm$^2$, TD F5≧10 daN/mm$^2$, MDE≧800 daN/mm$^2$, TDE≧400 daN/mm$^2$, MDE+TDE≧1200 daN/mm$^2$, MDS 105≦1.5%, MDS 150≦5.2%, and TD St/TD F5≦2.2. Also disclosed is a process for preparing semicrystalline polyester oriented films wherein an amorphous polyester film is successively subjected to a sequence of drawings comprising a lengthwise drawing in a single stage, a transverse drawing and a lengthwise drawing, wherein the first drawing mD is conducted at a temperature of between Tg +40° C. and Tc −20° C. and with a draw ratio λmD of between 1.2 and 3.

8 Claims, 1 Drawing Sheet

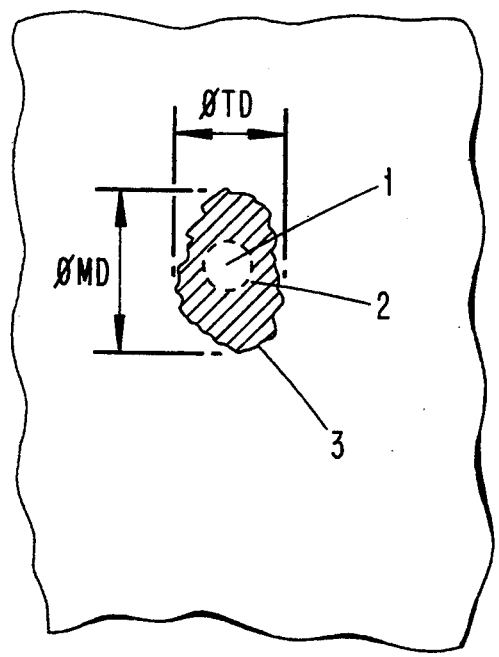

PROCESS FOR MAKING ORIENTED SEMICRYSTALLINE POLYESTER FILMS

The present invention relates to oriented films made of semicrystalline polyesters which have a combination of improved mechanical and physical properties, to a process for obtaining them using multiple drawing and to their use as bases for magnetic coatings.

It is known that oriented films made of semicrystalline polyesters are obtained by drawing in two directions at right angles an amorphous film originating from the melt extrusion of a crystallizable polyester. It is also known that the mechanical and physical properties of the biaxially oriented films depend to a large extent, in the case of a given polyester, on the conditions used during the film-forming process and especially the film drawing conditions: type of drawing sequences, temperatures and draw ratios in the two directions at right angles. Most generally, the polyester films are obtained by using a so-called "normal sequence" drawing process according to which the amorphous film is subjected firstly to a lengthwise drawing, that is to say in the film-forming machine direction (MD drawing) and then to a transverse drawing in a direction perpendicular to the machine direction (TD drawing). For the purpose of improving a certain number of mechanical and physical properties of the polyester films, for example their thickness uniformity, their modulus, their F5 value (tensile strength measured at an elongation of 5%) and the uniformity of these properties over the span of the width, it has been proposed to perform the drawing of the amorphous film firstly in the transverse direction and then in the lengthwise direction according to a so-called inverse sequence technique (cf. for example U.S. Pat. No. 2,995,779).

The reduction in size of equipment for recording and reading magnetic media has been reflected in the need to employ increasingly thinner polyester films to which it is indispensable to impart a combination of physical and mechanical properties (for example modulus, F5 value, dimensional stability, thickness uniformity, uniformity of the properties over the span of the width) which are better than those of thicker films. In order to obtain such films it has been proposed to modify the drawing procedure of the film-forming processes by modifying the number of the lengthwise drawing and/or transverse drawing stages, the order of these stages and their conditions (temperatures, draw ratios). Thus, in the Japanese Patent Applications published under Nos. 83/118,220 and 83/153,231 it has been proposed to prepare polyester films exhibiting an F5 value in the lengthwise direction (MD F5) which is higher than or equal to 25 kg/mm$^2$ and a lengthwise shrinkage ratio at 100° C. (MDS 100) lower than 2.5% by performing a drawing in a number of stages comprising two lengthwise (MD) drawing stages under conditions resulting in a singly drawn film exhibiting a noncrystalline orientation ratio of between 0.6 and 1 and a planar birefringence $\Delta n$ of between 0.002 and 0.1 or 0.06 and 0.2, and then a transverse drawing and a new lengthwise drawing. The planar birefringence MDn-TDn is the difference between the refractive index measured in the lengthwise direction of the film and the refractive index measured in the transverse direction. Although the films obtained by these processes exhibit a high MD F5 while retaining a TD F5 conforming to the industry's requirements (approximately 10 kg/mm$^2$), they have an insufficient dimensional stability (MDS 100 of between 1.8 and 2.06); furthermore, the increase in the number of the drawing stages and the need to resort to a planar draw ratio higher than or equal to 25 make the process costly because of the complexity of the equipment and its difficulty in use.

In European Patent 0,086,302 it has also been proposed to prepare biaxially drawn polyester films exhibiting an MD F5 value greater than or equal to 18 kg/mm$^2$, a TD F5 value higher than or equal to 17 kg/mm$^2$ and a dimensional stability in both directions (MDS 100 and TDS 100 which are lower than or equal to 2.5%). These values are attained at the cost of the use of multiple drawing comprising an MD drawing in two stages resulting in a singly drawn film exhibiting a noncrystalline orientation ratio of between 0.6 and 1 and a planar birefringence $\Delta n$ of between 0.02 and 0.1, then a transverse drawing and finally a redrawing in both directions successively (MD drawing then TD drawing) or simultaneously. This process suffers from the same disadvantages as the multistage processes described in the abovementioned Japanese applications. Obtaining high F5 values depends on the use of particularly high draw ratios (total lengthwise draw ratio of between approximately 8 and approximately 10; planar draw ratio of between 37 and 54).

The complexity of the proposed processes responds to the need to reconcile drawing conditions which have a contradictory effect on some of the properties sought after, for example on F5 and on the dimensional stability or the physical or mechanical properties in each of the drawing directions. The industry therefore still faces the problem of obtaining polyester films exhibiting a combination of physical and mechanical properties meeting the users' requirements by a process which is simple to use on an industrial scale. The present invention proposes to provide a solution to this problem.

More specifically, a first objective pursued by the present invention lies in the development of a process for the production of polyester films which is simple and easy to use on an industrial scale.

A second objective pursued by the present invention lies in the development of a process which is simple and easy to use on a industrial scale for the production of polyester films offering an excellent compromise between their mechanical and physical properties in the lengthwise and transverse directions, a good suitability for slitting into tapes and good abrasion resistance.

The third objective of the present invention is obtaining semicrystalline oriented polyester films exhibiting a high modulus and a high F5 value in the lengthwise direction while retaining the mechanical properties in the transverse direction (modulus and F5) meeting the requirements for commercial films: TD F5 higher than or equal to 10 daN/mm$^2$ and TD modulus higher than or equal to 400 daN/mm$^2$ and a high tape rigidity (sum MDE+TDE of the moduli in the lengthwise and transverse directions).

A fourth objective aimed at by the present invention lies in obtaining polyester films offering a good compromise between high mechanical properties and low MD and TD shrinkages.

A fifth objective pursued by the present invention consists in the manufacture of polyester films exhibiting a good suitability for slitting into tapes. It is known that, when a film is slit into narrow width tapes, various anomalies arise, especially dust formation and/or the formation of a lip on the tape along the cut edge, which are detrimental to the quality of the final magnetic tapes and to the formation of tape cakes. It is also known (cf. Japanese Patent Application published under No. 63/94,734) that polyester films exhibiting a ratio of the value of their tensile strength St in the transverse direction (TD St) to the value of their TD F5 which is lower than 2.2 have an excellent suitability for slitting into tapes.

As its sixth objective, the present invention proposes to obtain polyester films offering a good compromise between the physical and mechanical properties and the abrasion resistance, that is to say a low aptitude for the separation of the particles of filler from the polymer which surrounds them. It is known that the separation of filler particles under conditions of handling of the films and of use of the final products such as magnetic tapes, is promoted by the appearance of voids (decohesion) between the particles and the polymer during the drawing procedure. It is therefore important to reduce the formation of these voids during the film drawing as much as possible without, however, detriment to the physical and mechanical properties.

A seventh objective which the present invention proposes to meet lies in obtaining films exhibiting good thickness uniformity in the lengthwise and transverse directions.

More specifically, the first subject of the present invention is oriented films made of semicrystalline polyesters, characterized in that they exhibit the following properties:
— MD F5 $\geq$ 18 daN/mm$^2$
— TD F5 $\geq$ 10 daN/mm$^2$
— MDE $\geq$ 800 daN/mm$^2$
— TDE $\geq$ 400 daN/mm$^2$
— MDE+TDE $\geq$ 1200 dan/mm$^2$
— MDS 105 $\geq$ 1.5%
— MDS 150 $\leq$ 5.2%
— TD St/TD F5 $\geq$ 2.2.

A second subject of the present invention lies in a process for obtaining oriented films made of semicrystalline polyesters, consisting in subjecting an amorphous polyester film to a sequence of drawings comprising successively a lengthwise drawing in a single stage, a transverse drawing and a lengthwise drawing, characterized in that the temperature and draw ratio conditions of the first lengthwise drawing are chosen so that the drawn film resulting therefrom should exhibit:
  i) an axial birefringence (ax $\Delta$n) lower than or equal to 0.015;
  ii) a mean refractive index n $\leq$ 1.5775.

An axial birefringence denotes in the present application the representative value of the axial orientation of the polymer chains, calculated from the refractive indices MDn, TDn and Zn of the drawn film, which are measured respectively along the lengthwise and transverse axes and the axis normal to the plane of the film, by means of the expression:

$$ax \Delta n = MDn - \frac{TDn + Zn}{2}$$

The mean refractive index is the mean of the refractive indices (MDn+TDn+Zn)/3.

In the process according to the present invention the first lengthwise drawing (mD hereinafter) is carried out so that there should be only a very small orientating action on the chains of the polymer and on its crystallization. Under these conditions the process according to the invention can be considered as being an inverse sequence drawing process preceded by a weakly orienting and very slightly crystallizing mD drawing. It has been found surprisingly that the use of a lengthwise drawing stage of this type in an inverse sequence drawing process produces biaxially drawn polyester films exhibiting an excellent suitability for slitting into tapes, illustrated by a TD St/TD F5 ratio $\leq$ 2.2.

The crystallizable polyesters which can be employed in the process according to the present invention are those which are usually called upon for obtaining semicrystalline oriented films. They are preferably homopolyesters derived from terephthalic or naphthalenedicarboxylic acids (2,5- or 2,6-naphthalenedicarboxylic acid) and ethylene glycol. It is also possible to use copolyesters in which the ethylene terephthalate or naphthalenedicarboxylate units represent at least 80 mol % of the ester units. As acids and/or glycols which can be used in combination with terephthalic or naphthalenedicarboxylic acids and ethylene glycol there may be mentioned acids such as isophthalic acid, 4,4-dihydroxycarbonyldiphenyl sulphone; 4,4'-dihydroxycarbonyldiphenyl ether, alkanedioic acids containing from 4 to 16 carbon atoms (adipic, succinic or sebacic acid, for example) and glycols such as propylene glycol, 1,4-butanediol, 1,4-cyclohexanedimethanol and neopentyl glycol.

The polyesters employed for obtaining films according to the present invention contain the additives which are usually employed. In particular, they may contain any filler of internal or external origin, intended to impart to the biaxially drawn films a roughness which is suitable to ensure that they can be easily handled (reeling, slipping of the film over itself). The internal fillers are generally catalyst residues precipitated in the form of particles. External fillers which may be employed are particles of oxides or of salts of the metals of groups II, III and IV of the Periodic Classification of the elements, such as $CaCO_3$, $TiO_2$, $SiO_2$ or kaolin.

The process in accordance with the present invention is used in the following manner: a polyester heated to its melting temperature, that is approximately 250° to 300° C., is extruded in the form of a sheet cooled to 10°–70° C. on a casting drum. The amorphous film thus obtained is next subjected to the mD, TD and MD drawing stages under the conditions specified below. After the drawing the film is subjected to heat-setting under the usual temperature conditions. The heat-setting may be accompanied by a relaxation of the biaxially drawn film in the transverse direction; it is not necessary to perform a relaxation in the lengthwise direction in order to reach a low MD shrinkage ratio at 105° and 150° C., and this constitutes another advantage of the present process. However, carrying out such a relaxation would not lie outside the scope of the present invention.

The conditions of the first mD drawing are chosen such that the film mDF which results therefrom should have an axial birefringence ax $\Delta$n lower than or equal to 0.015 and a mean refractive index lower than or equal to 1.5775. Such a result is obtained when the lengthwise draw ratio $\lambda$mD of the amorphous film is maintained at a value lower than or equal to 3 and, preferably, lower than or equal to 2.5. During the mD drawing the draw ratio $\lambda$mD is preferably higher than 1.2. Within the range thus defined, $\lambda$mD is chosen as a function of its influence on the properties which are sought and bearing in mind the values of the draw ratios $\lambda$TD and $\lambda$MD and of their influence on the film properties. In particular, it has been found that in the case of a given total lengthwise draw ratio $\lambda mD \times \lambda MD$, the increase in $\lambda mD$ is reflected in a decrease in the axial orientation of the chains, but also in the value of MD F5. Under these conditions $\lambda mD$ is chosen within the abovementioned range to give the chains an axial orientation which is as small as possible at the end of this drawing without, however, causing the drop in the value of MD F5 of the final biaxially drawn film. The temperature to which the film is heated during this stage lies in a range extending from the glass transition temperature (Tg) $+40°$ C. to the crystallization temperature (Tc) $-20°$ C. (range from Tg $+40$ to Tc $\times 20$) and preferably in the range from Tg $+45°$ C. to Tc $-25°$ C. Thus, in the case of a polyethylene terephthalate (PET) film, the temperature used in the mD stage is between $120°$ and $150°$ C.

At the end of the lengthwise drawing mD the film is preferably cooled to a temperature ranging from Tg $-60°$ C. to Tg $-20°$ C. and more preferably Tg $-50°$ C. to Tg $-30°$ C., by passing over one or a number of fast rolls whose temperatures lies in one of the zones indicated above.

The transverse drawing TD is carried out under the usual temperature conditions; this temperature is generally between Tg $+10°$ C. and Tg $+40°$ C. and, preferably, between Tg $+15°$ C. and Tg $+35°$ C. The transverse draw ratio $\lambda TD$ is generally between 3 and 5. The value of $\lambda TD$ depends to some extent on its influence on the film properties and, consequently, on the type of film which it is desired to obtain and on the values chosen for $\lambda mD$ and for the final lengthwise draw ratio $\lambda MD$. It has been found, in fact, that the increase in $\lambda TD$ exerts a favorable influence on the axial orientation of the polymer chains in relation to the lengthwise drawing axis and therefore on the modulus in the lengthwise direction (MDE) for a given value of the overall lengthwise draw ratio $\lambda mD \times \lambda MD$. Under these conditions $\lambda TD$ must be chosen within the range given above, so as to result in an MDE which is as high as possible being obtained. This choice can be easily determined by a person skilled in the art using simple tests in each individual case.

The temperature at which the second lengthwise (MD) drawing is conducted is between Tg $+15°$ C. and Tg $+50°$ C. The values of the draw ratio $\lambda MD$ are included in a range from 2.3 to 5 and preferably between 2.4 and 4.5. The values of $\lambda MD$ are chosen bearing in mind the values of $\lambda mD$ and $\lambda TD$. In fact, it has been found that the total lengthwise draw ratio $\lambda mD \times \lambda MD$ exerts an influence on the axial orientation of the chains, on the lengthwise modulus MDE, on MD F5 and on the dimensional stability of the biaxially drawn film. In particular, it has been found that, at a given value of $\lambda mD$, the axial orientation of the chains, the modulus MDE and MD F5 increase when $\lambda mD \times \lambda MD$ increases. Conversely, the increase in $\lambda mD \times \lambda MD$ causes the increase in the lengthwise shrinkage at $105°$ C. and at $150°$ C. The value of $\lambda mD \times \lambda MD$ must therefore be chosen to produce the best possible compromise between high values of MDE and MD F5 and a low value of the lengthwise shrinkage. Values of $\lambda mD \times \lambda MD$ which are between 5.5 and 7 are suitable for attaining these contradictory objectives.

It has also been found that the total orientation resulting from the biaxial TD and MD drawing exerts an influence on the suitability for slitting into tapes and in particular that the latter is proportionately better as the planar draw ratio $\lambda TD \times \lambda MD$ decreases. Under these conditions $\lambda TD$ and $\lambda MD$ are preferably chosen within the ranges defined above so as to make the draw ratio $\lambda TD \times \lambda MD$ lower than or equal to 12.5.

Finally, $\lambda mD$, $\lambda MD$ and $\lambda TD$ are preferably chosen within the defined ranges so as to make the ratio $(\lambda mD + \lambda MD)/\lambda TD$ higher than 1.35 in order that the mechanical and physical properties may be the best possible.

The total draw ratio (planar drawing) $\lambda Md \times \lambda TD \times \lambda MD$ is preferably at least 18. The use of a weakly orienting and slightly crystallizing lengthwise drawing stage prior to an inverse sequence makes it pointless to resort to planar orientation ratios higher than 26, with the result that the latter is preferably between 19 and 26.

The process according to the present invention makes it possible to obtain, simply and without recourse to high planar ratios, polyester films exhibiting a wide range of physical and mechanical properties such as semitensilized, tensilized and supertensilized films. It is very particularly suitable for obtaining films exhibiting simultaneously a) good physical and mechanical properties in the lengthwise direction and physical and mechanical properties in the transverse direction which meet the requirements of the ultimate users, b) a low MD shrinkage ratio at $105°$ and $150°$ C., c) a good suitability for slitting into tapes and d) a good resistance to decohesion, and in particular films exhibiting the combination of the properties whose values have been specified above and which form one of the subjects of the present invention. To obtain such films the draw ratios $\lambda mD$, $\lambda TD$ and $\lambda MD$ are chosen within the ranges defined above such that:

i) the total lengthwise draw ratio $\lambda mD \times \lambda MD$ should be between 5.5 and 6.5;

ii) the total planar draw ratio $\lambda MD \times \lambda TD$ should be lower than or equal to 12.5;

iii) the total planar draw ratio $\lambda mD \times \lambda TD \times \lambda MD$ should be between 19 and 26;

iv) the quotient of the total lengthwise draw ratio $\lambda mD \times \lambda MD$ divided by $\lambda TD$ should be higher than or equal to 1.45.

The biaxially drawn film is next subjected to heat-setting under the usual conditions. In general, the heat-setting temperature is between $180°$ and $250°$ C. During the heat-setting the biaxially drawn film can be subjected to a relaxation in the transverse direction, so as to improve its dimensional stability. The conditions of this relaxation are chosen so as to give the biaxially drawn film a TD shrinkage ratio at $105°$ C. lower than or equal to 1 and preferably between 0 and 0.5%. The transverse relaxation ratio is preferably within a range from 3 to 8%.

The process according to the invention can be used to obtain films of variable thickness, for example between 5 and 100 $\mu m$. However, it is very particularly suitable for obtaining thin films of thickness between 5 and 30 $\mu m$.

Besides their good physicomechanical properties, the films obtained by the process according to the invention exhibit a good resistance to abrasion, which is explained by an excellent cohesion between the polyester and the particles of fillers which it contains. The filler/polymer cohesion is assessed by measuring the mean decohesion area, that is to say the area of the void surrounding the particle/polymer space, under conditions which will be defined below.

The use, in the process according to the invention, of a lengthwise drawing under conditions which do not result in the axial orientation of the polymer chains and in polymer crystallization makes it possible to obtain films with high MD F5 because it permits the use of total lengthwise draw ratios which are higher than those which can be called upon in an inverse sequence process. Similarly, the use of the mD drawing stage plays a part in producing high moduli because it makes it possible to attain high total lengthwise draw ratios ($\lambda mD \times \lambda MD$) under a low stress. Finally, it makes it possible to produce a good compromise between lengthwise modulus and lengthwise shrinkage in the range 100°–150° C. and decohesion, while preserving the physicomechanical properties in the transverse direction which are acceptable to the users. Finally, the use of such a stage makes it possible to endow the polyester films obtained with a good suitability for slitting into tapes.

Although the films according to the present invention can find many applications, they are particularly highly suitable for the production of magnetic tapes by deposition of a magnetic coating of known type using the usual techniques. It is possible, for example, to coat the films according to the invention by means of a composition consisting of a powdered magnetic material in a polymeric binder or by depositing a metal such as Fe, Co, Ni or their alloys by vacuum evaporation.

Another subject of the present invention is therefore a magnetic recording material consisting of a semicrystalline polyester film and a magnetic coating, characterized in that the base polyester film exhibits the following characteristics:
—MD F5 $\geq$ 18 daN/mm$^2$
—TD F5 $\geq$ 10 daN/mm$^2$
—MDE $\geq$ 800 daN/mm$^2$
—TDE $\geq$ 400 daN/mm$^2$
—MDE+TDE $\geq$ 1200 daN/mm$^2$
—MDS 105 $\leq$ 1.5%
—MDS 150 $\leq$ 5.2%
—TD St/TD F5 $\leq$ 2.2.

The following examples illustrate the invention and show how it can be put into practice. In these examples MDE, TDE, MD F5 and TD F5, the shrinkages in the transverse and lengthwise directions and the void surface area have been determined under the conditions described below:

1. MDE, TDE, MD and TD F5 and the tensile strength (St) were measured according to ASTM standard D 882.
2. Circular test pieces 100 mm in diameter are cut from a polyester film after marking of the transverse drawing and lengthwise drawing directions of the film. The test pieces are then heated to 105° or to 150° C. for 30 min in a thermostated ventilated oven. After cooling, the diameters of the test pieces are determined in the transverse direction (DT) and in the lengthwise direction (DL) by means of a measuring block consisting of a measurement scale graduated in 0.1 mm engraved on an illuminated glass plate and of a sighting telescope. The shrinkage is expressed and calculated by means of the formulae:

$-TS = 100 - DT$ $-LS = 100 - DL.$

3. Mean expansion ratio of the void surface area (MER)

To determine the MER, the procedure is as follows:

A rectangular film sample 2.5 cm $\times$ 7 cm is taken from a PET film, on which the drawing directions and the face which has been in contact with the casting drum are marked. This sample is clamped to a glass microscope slide and the assembly is then immersed for 35 minutes in an aqueous 0.45N sodium hydroxide solution maintained at 80° C. The sample is then rinsed with demineralized water (4 min) and then with ethanol (20 s). A 1-cm$^2$ piece of this sample is then examined with a scanning electron microscope (the marking of the drawing directions being preserved) and the dimensions of the decohesion around a filler are determined in the drawing directions ($\phi$MD) and ($\phi$TD), which correspond to the maximum and minimum dimensions of the decohesion. The mean values of these dimensions are calculated over 30 measurements for a filler of given volume-median diameter.

In the case of a substantially spherical filler the MER in the plane of the film is expressed, in the case of a filler of given diameter, by the expression:

$$MER = \frac{\phi MD \times \phi TD}{(\phi c)^2}$$

in which $\phi$MD, $\phi$TD and $\phi$c denote the size of the decohesion area in the lengthwise drawing direction, the size of the decohesion area in the transverse direction and the volume-median diameter of the filler, respectively.

If the film contains fillers of different volume-median diameters, the MER is measured for each filler diameter.

The figure which is attached by way of illustration shows a top view of a section in the plane of the film of a particle and of the decohesion volume which surrounds it. In this figure, (1) shows the section of the filler, (2) the decohesion area and (3) the edge of the polyester.

4. Axial birefringence and mean refractive index

These are calculated from values of the refractive indices MDn, TDn and Zn measured by means of an Abbe refractometer using the method of R. J. Samuels, J. Appl. Polymer Sci. 26 1383–1412 (1981).

5. Thickness variation ($\Delta$th)

The thickness variation of the film $\Delta$th is measured by means of a device sold under the trade name Anritsu by the company Anritsu, equipped with a mechanical sensor, a travel system and an automatic computing system. The thickness variations are measured on a 3-m tape and the measurement is repeated 3 times in the case of each sample. The system determines the minimum and maximum height deviation and calculates $\Delta$th by means of the formula:

$$\Delta th = \frac{|Mth - mth|}{mean\ th} \times 100$$

in which:
—Mth is the maximum height
—mth is the minimum height
—mean th is the mean height calculated over the recorded thickness profile.

Depending on the value of $\Delta$th the films are classified into four categories:

—A: Δth from 0.3 to 0.5%
—B: Δth from >0.4 to 0.6%
—C: Δth from 0.5 to 0.8%
—D: Δth >0.8%.

The material called upon in the following examples was a polyethylene terephthalate (PET) which had an intrinsic viscosity of 0.75 dl/g, measured at 25° C. on a solution in ortho-chlorophenol, a glass transition temperature (Tg) of 80° C. (measured at 20° C./min with a Du Pont 1090 differential thermal analyzer) and a crystallization temperature (Tc) of 170° C. (measured under the same conditions as the Tg) and containing:

a) 0.15% by weight of a filler consisting of silica particles of volume-median diameter $\phi 1 = 0.535$ μm (sold by the company Nippon Shokubai under the trade reference KE-E 50), b) 0.03% by weight of silica particles of volume-median diameter $\phi 2$ 0.885 μm (sold by the company Nippon Shokubai under the trade reference KE-E 90).

EXAMPLES 1 to 7 AND COMPARATIVE TESTS A to G

The PET described above is melt-extruded through a slot die in the form of a thick film which is cooled to 30° C. by electrostatic pinning to a cooling drum so as to form an amorphous film (F). (F) is then subjected to a lengthwise drawing mD, under temperature and draw ratio conditions which appear in Table (1) below, by successively passing over a slow roll and then over a fast roll at 30° C. The axial birefringence and the mean refractive index n of the singly drawn film (F1) obtained during this stage are measured and then (F1) is subjected successively to a transverse drawing, then to a second lengthwise drawing under the conditions indicated in Table (1). The drawn film is next subjected to heat-setting at a maximum temperature of 210° C. with a transverse relaxation of 2%.

The film thus obtained, denoted (F2) hereinafter is next subjected to the measurement of its mechanical properties. The results obtained are recorded in Table (2).

TABLE 1

| | mD drawing λmD | T °C. | TD drawing λTD | T °C. | MD drawing λMD | T °C. | λmD × λMD | λTD × λMD | λmD × λTD × λMD | $\frac{\lambda mD \times \lambda MD}{\lambda TD}$ |
|---|---|---|---|---|---|---|---|---|---|---|
| EX. | | | | | | | | | | |
| 1 | 1.9 | 125 | 3.2 | 100 | 3.2 | 110 | 6.08 | 10.24 | 19.46 | 1.90 |
| 2 | 1.9 | 125 | 3.8 | 100 | 3.2 | 110 | 6.08 | 12.16 | 23.10 | 1.60 |
| 3 | 2.4 | 125 | 3.4 | 100 | 2.5 | 110 | 6.00 | 8.50 | 20.40 | 1.76 |
| 4 | 2.4 | 125 | 4.0 | 100 | 2.5 | 110 | 6.00 | 10.00 | 24.00 | 1.50 |
| 5 | 2.4 | 125 | 4.0 | 100 | 2.7 | 110 | 6.48 | 10.80 | 25.90 | 1.62 |
| 6 | 1.9 | 125 | 3.8 | 100 | 2.8 | 110 | 5.32 | 10.64 | 20.20 | 1.40 |
| 7 | 1.9 | 125 | 3.8 | 100 | 2.8 | 110 | 5.32 | 10.64 | 20.21 | 1.40 |
| COMP. TESTS | | | | | | | | | | |
| A | 1.9 | 125 | 3.8 | 100 | 2.0 | 110 | 3.80 | 7.60 | 14.44 | 1.00 |
| B | 1.9 | 125 | 4.4 | 100 | 2.4 | 110 | 4.56 | 10.50 | 20.06 | 1.04 |
| C | 1.4 | 125 | 3.6 | 100 | 2.4 | 110 | 3.36 | 8.64 | 12.09 | 0.93 |
| D | 1.4 | 125 | 3.6 | 100 | 3.2 | 110 | 4.48 | 11.52 | 16.13 | 1.24 |
| E | 1.4 | 125 | 4.2 | 100 | 2.8 | 110 | 3.92 | 11.76 | 16.46 | 0.93 |
| F | 1.9 | 125 | 4.4 | 100 | 3.1 | 110 | 5.89 | 13.64 | 25.91 | 1.34 |
| G | 1.9 | 125 | 3.2 | 100 | 2.4 | 110 | 4.56 | 7.68 | 14.60 | 1.43 |

TABLE 2

| | | FILM F1 | | PHYSICAL AND MECHANICAL PROPERTIES FILM F2 | | | | | |
|---|---|---|---|---|---|---|---|---|---|
| | mean n | ax Δn | MDE daN/mm² | TDE daN/mm² | MDE + TDE daN/mm² | MD F5 daN/mm² | TD St daN/mm² | TD F5 daN/mm² |
| EXAMPLES | | | | | | | | |
| 1 | 1.5760 | 0.00875 | 878 | 402 | 1280 | 21.4 | 17.2 | 10.0 |
| 2 | 1.5760 | 0.00875 | 841 | 434 | 1275 | 20.7 | 19.5 | 10.1 |
| 3 | 1.5767 | 0.00110 | 832 | 425 | 1257 | 19.6 | 19.2 | 10.0 |
| 4 | 1.5767 | 0.00110 | 816 | 407 | 1223 | 18.4 | 19.4 | 10.0 |
| 5 | 1.5767 | 0.00110 | 878 | 416 | 1294 | 21.7 | 20.2 | 10.1 |
| 6 | 1.5760 | 0.00875 | 742 | 447 | 1189 | 16.2 | 19.5 | 10.2 |
| 7 | 1.5760 | 0.00875 | 730 | 436 | 1166 | 16 | 17.5 | 9.7 |
| COMPAR. TESTS | | | | | | | | |
| A | 1.5760 | 0.00875 | 530 | 485 | 1015 | 11.0 | 20.0 | 9.7 |
| B | 1.5760 | 0.00875 | 571 | 480 | 1051 | 11.8 | 22.0 | 10.2 |
| C | 1.5763 | 0.00550 | 523 | 452 | 975 | 10.7 | 21.3 | 9.9 |
| D | 1.5763 | 0.00550 | 665 | 437 | 1102 | 13.9 | 21.0 | 9.7 |
| E | 1.5763 | 0.00550 | 577 | 457 | 1034 | 12.0 | 21.0 | 9.5 |
| F | 1.5760 | 0.00875 | 737 | 478 | 1215 | 17.1 | 24.0 | 10.6 |
| G | 1.5760 | 0.00875 | 666 | 431 | 1097 | 13.4 | 19.0 | 9.7 |

| PHYSICAL AND MECHANICAL PROPERTIES FILM F2 | | | | | | | |
|---|---|---|---|---|---|---|---|
| MDS 105 % | MDS 150 % | TDS 105 % | TD St/ TD F5 | MER | Φ1 | Φ2 | Δth |

TABLE 2-continued

| EXAMPLES | | | | | | | |
|---|---|---|---|---|---|---|---|
| 1 | 1.5 | 5.2 | 0.4 | 1.7 | 5.9 | 6.4 | A |
| 2 | 1.5 | 5.2 | 0.5 | 1.9 | 6.7 | 8.7 | A |
| 3 | 1.2 | 4.6 | 0.4 | 1.9 | 5.6 | 5.4 | A |
| 4 | 1.1 | 3.6 | 0.4 | 1.9 | 4.2 | 5.2 | A |
| 5 | 1.4 | 4.9 | 0.4 | 2.0 | 7.8 | 9.0 | A |
| 6 | 1.3 | 3.7 | 0.3 | 1.9 | 4.7 | 6.0 | B |
| 7 | 1.2 | 4.5 | 0.4 | 1.8 | 4.2 | 4.7 | B |
| COMPAR. TESTS | | | | | | | |
| A | 1.0 | 2.6 | 0.3 | 2.1 | 2.3 | 3.5 | D |
| B | 1.0 | 3.1 | 0.5 | 2.2 | 3.8 | 5.4 | C |
| C | 0.8 | 2.5 | 0.4 | 2.2 | 2.2 | 2.5 | D |
| D | 1.4 | 3.6 | 0.4 | 2.2 | 3.8 | 4.6 | C |
| E | 0.9 | 2.7 | 0.4 | 2.2 | 3.75 | 5.2 | D |
| F | 1.4 | 4.4 | 0.3 | 2.3 | 8.6 | 11.6 | B |
| G | 1.0 | 2.5 | 0.4 | 2.0 | 2.4 | 3.1 | C |

COMPARATIVE TEST H

An attempt was made to prepare a biaxially drawn film by operating according to the process of Example 1, but after having left out the mD drawing and having applied to the MD drawing a ratio $\lambda MD$ of 6.08 equivalent to the total lengthwise draw ratio $\lambda mD \times \lambda MD$ of Example 1, everything else being similar otherwise. Under these conditions it has not been possible to obtain a continuous film because of breakages during the lengthwise drawing.

COMPARATIVE TEST I

Tests 1 to 7 are repeated, no first lengthwise drawing being carried out ($\lambda mD = 1.0$).

The values of the various parameters and the results obtained are shown below.

1) Drawing parameters:
   —$\lambda mD = 1.0$
   —$\lambda TD = 3.7$ at 100° C.
   —$\lambda MD = 4.75$ at 110° C.
   —$\lambda TD \times \lambda MD = 17.58$
   —$\lambda mD \times \lambda TD \times \lambda MD = 17.58$ $$\frac{\lambda mD \times \lambda MD}{\lambda TD} = 1.28$$

2) Film properties:
   No film F1.
   Film F2:
      —MDE = 820 dan/mm²
      —TDE = 450 daN/mm²
      —MDE+TDE = 1270 daN/mm²
      —MD F5 = 20.2 daN/mm²
      —TD St = 28.5 daN/mm²
      —TD F5 = 11.5 daN/mm²
      —MDS 105 = 2.4%
      —MDS 150 = 8.4%
      —TDS 105 = 1.5%
      —TD St/TD F5 = 2.5

COMPARATIVE TEST J

Tests 1 to 7 are repeated, the first lengthwise drawing $\lambda mD$ being carried out in 2 successive stages and without cooling the film before the transverse drawing (according to DE-A- 3,62 1,205).

The values of the various parameters and the results obtained are shown below.

1) Drawing parameters:
   —$\lambda mD = 3.0$ in all:
      1st stage: draw ratio 1.4 at 115° C.
      2nd stage: draw ratio 2.14 at 95° C.
   —$\lambda TD = 3.7$ at 100° C.
   —$\lambda MD = 1.6$ at 120° C.
   —$\lambda TD \times \lambda MD = 5.92$
   —$\lambda mD \times \lambda TD \times \lambda MD = 17.8$
   —$\lambda mD \times \lambda MD = 4.8$ $$\frac{\lambda mD \times \lambda MD}{\lambda TD} = 1.30$$

2) Film properties
   Film F1:
      —mean n = 1.5840
      —ax $\Delta n$ = 0.0400
   Film F2:
      —MDE = 680 daN/mm²
      —TDE = 430 daN/mm²
      —MDE+TDE = 1110 daN/mm²
      —MD F5 = 16.0 daN/mm²
      —TD St = 22.8 daN/mm²
      —TD F5 = 10.7 daN/mm²
      —MDS 105 = 1.7%
      —MDS 150 = 5.0%
      —TDS 105 = 0.6%
      —TD St/TD F5 = 2.1

We claim:

1. A process for obtaining oriented films made of semicrystalline polyesters, wherein an amorphous polyester film is subjected to a sequence of drawings comprising successively a lengthwise drawing in a single stage, a transverse drawing and a lengthwise drawing, wherein the first drawing mD is conducted at a temperature of between Tg +40° C. and Tc −20° C. and with a draw ratio $\lambda mD$ of between 1.2 and 3 in order that the drawn film resulting therefrom should exhibit:
   i) an axial birefringence (ax $\Delta n$) lower than or equal to 0.015;
   ii) a mean refractive index $\leq 1.5775$;
   iii) $\lambda mD \times \lambda MD$ is between 5.5 and 7 and;
   iv) $(\lambda mD \times \lambda MD)/\lambda TD \geq 1.35$.

2. Process according to claim 1, characterized in that the TD transverse drawing is conducted with a draw ratio $\lambda TD$ of between 3 and 5 and at a temperature of between Tg +10° C. and Tg +40° C.

3. Process according to claim 1, characterized in that the second MD drawing is carried out with a draw ratio $\lambda MD$ of between 2.3 and 5 and at a temperature of Tg + 15° C. to Tg +50° C.

4. Process according to claim 1, characterized in that the planar draw ratio $\lambda TD \times \lambda MD$ is lower than or equal to 12.5.

5. Process according to claim 1, characterized in that the total planar draw ratio $\lambda mD \times \lambda TD \times \lambda MD$ is between 19 and 26.

6. A process for obtaining oriented films made of semicrystalline polyester wherein an amorphous polyester film is successively subjected to a sequence of drawings comprising a lengthwise drawing in a single stage, a transverse drawing and a lengthwise drawing, wherein the first drawing mD is conducted at a temperature of between Tg $+40°$ C. and Tc $-20°$ C. and with a draw ratio $\lambda mD$ of between 1.2 and 3 in order that the drawn film resulting therefrom should exhibit (i) an axial birefringence (ax $\Delta n$) lower than or equal to 0.015, and (ii) a mean refractive index $\leq 1.5775$ and at the end of the lengthwise drawing mD, the film is cooled to a temperature ranging from Tg $-60°$ C. to Tg $-20°$ C. by passing the film over at least one fast roll whose temperatures ranges from Tg $-60°$ C. to Tg $-20°$ C.

7. A process for obtaining oriented films made of semicrystalline polyester wherein an amorphous polyester film is successively subjected to a sequence of drawings comprising a lengthwise drawing in a single stage, a transverse drawing and a lengthwise drawing, wherein the first drawing mD is conducted at a temperature of between Tg $+40°$ C. and Tc $-20°$ C. and with a draw ratio $\lambda mD$ of between 1.2 and 3 in order that the drawn film resulting therefrom should exhibit (i) an axial birefringence (ax $\Delta n$) lower than or equal to 0.015, and (ii) a mean refractive index $\leq 1.5775$ and at the end of the lengthwise drawing mD, the film is cooled to a temperature ranging from Tg $-50°$ C. to Tg $-30°$ C. by passing the film over at least one fast roll whose temperatures ranges from Tg $-60°$ C. to Tg $-20°$ C.

8. A process for the preparation of oriented films having properties of MD F5$\geq$18 daN/mm2, TD F5$\geq$10 daN/mm$^2$, MDE$\geq$800 daN/mm$^2$, TDE$\geq$400 daN/mm$^2$, MDE+TDE$\geq$1200 daN/mm$^2$, MDS 105$\leq$1.5%, MDS 150$\leq$5.2%, and TD St/TD F5$\leq$2.2, comprised of subjecting an amorphous film to a successive sequence of drawings comprising a lengthwise drawing, a transverse drawing and a lengthwise drawing, then to a heat-setting, wherein: (a) the first lengthwise drawing is carried out at a temperature of Tg $+40°$ C. to Tc $-20°$ C. and with a draw ratio of $\lambda mD$ taken in the range from 1.2 to 3; (b) the transverse drawing is carried out with a draw ratio $\lambda TD$ taken in the range from 3 to 5; (c) the second lengthwise drawing is carried out with a draw ratio $\lambda MD$ taken in the range from 2.3 to 5; (d) the total lengthwise draw ratio $\lambda mD \times \lambda MD$ is between 5.5 and 6.5; (e) the total draw ratio $\lambda TD \times \lambda MD$ is lower than or equal to 12.5; (f) the total planar draw ratio $\lambda mD \times \lambda TD \times \lambda MD$ is between 19 and 26; and (g) the ratio $(\lambda mD \times \lambda MD)/\lambda TD$ is higher than or equal to 1.45.

* * * * *